P. P. Josef,

Egg Carrier

No. 96,119. Patented Oct. 26, 1869.

Witnesses

Inventor
Philip P. Josef

United States Patent Office.

PHILIP P. JOSEF, OF BUFFALO, NEW YORK, ASSIGNOR TO HIMSELF AND WALLACE JOHNSON, OF SAME PLACE.

Letters Patent No. 96,119, dated October 26, 1869.

IMPROVEMENT IN EGG-CARRIER.

The Schedule referred to in these Letters Patent and making part of the same.

To all whom it may concern:

Be it known that I, PHILIP P. JOSEF, of Buffalo, in the county of Erie, and State of New York, have invented a new and useful Improvement in Supports for Egg-Carriers; and I do hereby declare that the following is a full, clear, and exact description thereof, which will enable others skilled in the art to make and use the same, reference being had to the accompanying drawings, forming a part of this specification, in which—

Figure 1 is a perspective view of my invention.

Figure 2, a vertical sectional view of the same, taken in the line $s\ s$, fig. 1.

Similar letters of reference indicate like parts.

This invention relates to a new and improved method of supporting the cells or pockets of egg-carriers, by means of longitudinal slats extending vertically through the trays or frames containing these cells or pockets, and having for its object the attainment of a more secure and perfect manner of holding and sustaining said cells when filled with eggs, and subjected to the jar and strain of transportation, than has hitherto been accomplished by the use of strings or wire, as in the patents of Bryant, Amsden, and others.

Figure 1:
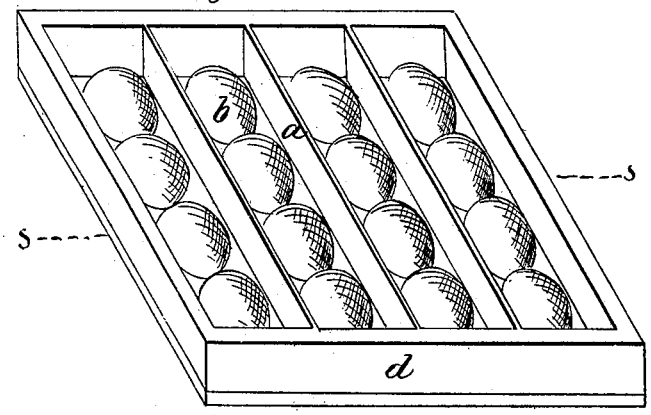
Fig. 1 represents a tray fitted up, the slats $a\ a\ a$ extending horizontally across and vertically through the frame $d$.
Figure 2:
Fig. 2 represents a vertical section of the same, showing the slats or supports $a\ a\ a$ as arranged between the cells $b\ b\ b$.

These drawings sufficiently explain the form and manner of using these supports.

I form these slats or supports, by preference, of wood, in any manner known to workers in the same, that being the cheapest, and, in many respects, the best material therefor, but they may be made of metal, pasteboard, or other suitable substance. I secure them in the frames by means of gains or slots cut therein, or by other equivalent methods.

What I claim as new, and desire to secure by Letters Patent, is—

A slatted support for the cells or pockets of egg-carriers, constructed and arranged substantially as and for the purpose set forth.

PHILIP P. JOSEF.

Witnesses:
 GEO. BURT,
 S. N. GAGER.